(12) United States Patent
Kondoz et al.

(10) Patent No.: US 8,472,508 B2
(45) Date of Patent: Jun. 25, 2013

(54) DATA TRANSMISSION

(75) Inventors: Ahmet Kondoz, Guildford (GB); Nilantha Nandima Katugampala, Pannipitiya (LK); Kholdoon Taha Al-Naimi, Guildford (GB); Stephane Villette, Dissay sous Courcillon (FR)

(73) Assignee: Mulsys Ltd, Guildford, Surrey (GB)

( * ) Notice: Subject to any disclaimer, the term of this patent is extended or adjusted under 35 U.S.C. 154(b) by 1083 days.

(21) Appl. No.: 11/568,837

(22) PCT Filed: May 6, 2005

(86) PCT No.: PCT/GB2005/001729
§ 371 (c)(1),
(2), (4) Date: Sep. 17, 2007

(87) PCT Pub. No.: WO2005/109923
PCT Pub. Date: Nov. 17, 2005

(65) Prior Publication Data
US 2008/0165885 A1   Jul. 10, 2008

(30) Foreign Application Priority Data
May 8, 2004  (GB) .................................. 0410321.4

(51) Int. Cl.
*H04B 1/38* (2006.01)
*H04L 27/00* (2006.01)
*G10L 11/00* (2006.01)

(52) U.S. Cl.
USPC ........... 375/222; 375/219; 375/295; 704/200; 704/275

(58) Field of Classification Search
USPC .......................... 375/219–220, 222, 237–239, 240.26–240.29, 240.01, 240.16, 240.18–240.2, 375/242, 254, 295, 316, 353, 362–365; 704/200, 704/275, 500, 503, 212, 211, 225, 226
See application file for complete search history.

(56) References Cited

U.S. PATENT DOCUMENTS

| | | | | |
|---|---|---|---|---|
| 7,289,574 | B2 * | 10/2007 | Parolari | 375/295 |
| 2001/0019592 | A1 * | 9/2001 | Solondz | 375/267 |
| 2004/0017846 | A1 * | 1/2004 | Fernandez-Corbaton et al. | 375/152 |
| 2004/0062318 | A1 * | 4/2004 | Yu et al. | 375/264 |
| 2004/0261122 | A1 * | 12/2004 | Kim et al. | 725/131 |

FOREIGN PATENT DOCUMENTS

| | | | |
|---|---|---|---|
| WO | WO 84/04217 | A1 | 10/1984 |
| WO | WO 03/071521 | A | 8/2003 |
| WO | WO 03/071521 | A1 | 8/2003 |
| WO | WO 03071521 | A1 * | 8/2003 |

\* cited by examiner

*Primary Examiner* — Sam K Ahn
*Assistant Examiner* — Linda Wong
(74) *Attorney, Agent, or Firm* — Fraser Clemens Martin & Miller LLC; William J. Clemens

(57) ABSTRACT

A system for transmitting input data over a speech channel of a network comprising: a modulator arranged to produce a modulated waveform signal transforming the data for transmission over the network; a channel compensation filter arranged to filter the modulated waveform signal after it has been transmitted over the speech channel to compensate for the response of the speech channel; and a demodulator arranged to retrieve the data from the filtered waveform signal.

24 Claims, 14 Drawing Sheets

Data bits frame    Modulation
101011110010110    ⟹

| Track 1:   | 0   | 5   | 10  | 15  | 20  | ㉕  | 30  | 35  |
|------------|-----|-----|-----|-----|-----|-----|-----|-----|
| Track 2:   | 1   | 6   | 11  | ⑯  | 21  | 26  | 31  | 36  |
| Track 3:   | 2   | 7   | 12  | 17  | 22  | 27  | ㉜  | 37  |
| Track 4:   | 3   | 8   | ⑬  | 18  | 23  | 28  | 33  | 38  |
| Track 5:   | 4   | 9   | 14  | 19  | 24  | 29  | ㉞  | 39  |
| Data bits: | 000 | 001 | 010 | 011 | 100 | 101 | 110 | 111 |

DATA TRANSMISSION

BACKGROUND OF THE INVENTION

The present invention relates to data transmission over telecommunications networks, and in particular to the transmission of digital data over speech channels of such networks.

Using speech channels for the transmission of data over networks can have advantages under some circumstances because they are generally given a high priority and are subject to relatively small delays. This is necessary to ensure that normal speech can be transmitted without unacceptable loss of clarity, whereas data channels are generally susceptible to greater delay. However transmitting non-speech data over speech channels can be difficult, especially where low bit rate speech coding systems are used, such as in GSM. These systems have been developed recently, and have data rates of below 50 kb/s and often below 30 kb/s. The bit rate that can be used for speed coding can be even lower, and may be less than 20 kb/s. For example, a typical GSM voice channel has a 22.8 kb/s rate, but only 13 kb/s of the gross bit rate is used for speech coding.

One problem that systems such as the GSM system do not fully address is security. The GSM system ensures subscriber identity confidentiality and provides subscriber authentication, as well as confidentiality of user traffic and signaling. The ciphering algorithms used in GSM have proved to be effective in ensuring traffic confidentiality. However, the traffic confidentiality is only maintained across the radio access channel. Voice traffic is transmitted across the core circuit-switched networks 'in-clear' in the form of PCM or ADPCM speech, which opens up the possibility of unauthorized access, to GSM to GSM, or GSM to PSTN conversations. For end-to-end security the speech signal must be encrypted. This means that it no longer resembles speech, and cannot therefore be sent over the voice channel in the same way as unencrypted speech. Instead it needs to be considered in the same way as general digital data. A disadvantage of the GSM speech channel is that security is controlled by the network operator, not the end user. Control by the end user may be preferable in some applications.

Although the GSM data channel can be used for encrypted speech transmission, this approach suffers from a number of disadvantages, in particular delays as mentioned above. The GSM data channel typically requires 28 to 31 seconds to establish a connection, of which approximately 18 seconds are taken up by the GSM modem handshaking time. In addition, the round trip time of the GSM data channel is between 1 and 2 seconds for the $95^{th}$ percentile.

SUMMARY OF THE INVENTION

Therefore according to a first aspect of the present invention there is provided a system for transmitting input data over a speech channel of a network, the system comprising:
  a modulator arranged to produce a modulated waveform signal transforming the data for transmission over the network;
  a channel compensation filter arranged to filter the modulated waveform signal after it has been transmitted over the speech channel to compensate for the response of the speech channel; and
  a demodulator arranged to retrieve the data from the filtered waveform signal.

Preferably the modulator is further arranged to modify the modulated signal so that it will be passed by a voice activity detector. For example this may be by adding periodicity to the signal, by spectral shaping, by amplitude modulation, or by other suitable methods.

Preferably the modulator is arranged to generate the modulated waveform signal comprising symbols, with each symbol having at least one feature that has a position, an amplitude, and a sign, wherein at least one of the position, the amplitude and the sign of the feature is determined by the data.

Preferably the demodulator is arranged to monitor the time lag in the received modulated signal and correct for it. The demodulator may be arranged to correct for the time lag before demodulating the received modulated waveform.

Preferably the modulated waveform is arranged to be produced and detected at a first sample rate, and the demodulator is arranged to up sample the received waveform signal to a higher sample rate before correcting for the time lag.

The system can be used for any type of data, one example being compressed voice signals. The system may therefore further comprise a speech compression module arranged to produce the input data from a speech input, and a speech decompression module arranged to decode a speech output from the demodulated data. The system may further comprise an encryption module arranged to encrypt the input data or the bit stream from the speech encoder and a decryption module arranged to decrypt the demodulated bit stream.

The present invention further provides a modem arranged to communicate over a voice channel of a network, the modem comprising:
  a modulator arranged to produce a modulated waveform signal transforming data for transmission over the network;
  a channel compensation filter arranged to receive and filter modulated waveform signals transmitted over the speech channel to compensate for the response of the speech channel; and
  a demodulator arranged to retrieve the data from the filtered waveform signal.

The present invention further provides a method of transmitting input data over a speech channel of a network, the method comprising:
  producing a modulated waveform signal transforming the input data for transmission over the network;
  filtering the modulated waveform signal after it has been transmitted over the speech channel to compensate for the response of the speech channel; and
  retrieving the data from the filtered waveform signal.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
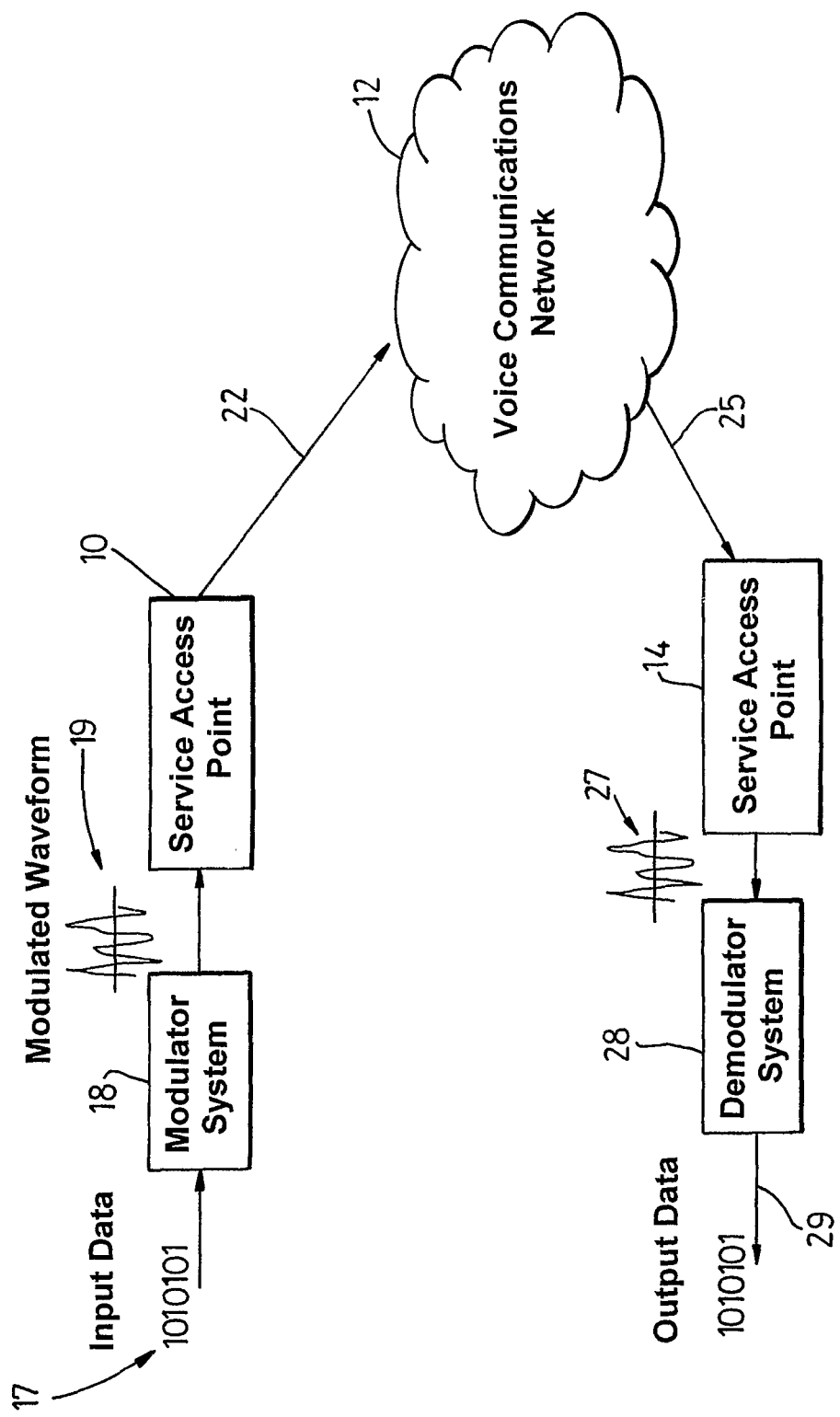
FIG. 1 is a diagrammatic representation of a data communication system according to the present invention.

Referring to FIG. 1, a voice communication system comprises a first service access point (SAP) 10, arranged to transmit voice over a voice communications network 12, and a second SAP 14, arranged to receive voice over the network. A data modulator 18 is arranged to receive input data 17 and to convert the input data signal to a modulated waveform 19 for input to the first SAP 10. If a GSM mobile terminal is used as the first SAP, it includes a speech compression module in the form of a GSM speech encoder which converts the modulated signal 19 to a bit stream 22 for transmission onto the network 12. The second SAP 14 is arranged to receive the bit stream 25 from the network 12, and includes a speech decompression module for converting the bit stream 25 back to a modulated waveform signal 27. A demodulator 28 is arranged to demodulate the received modulated waveform signal 27 to a data signal 29, and to output the data signal 29. In practice each of the SAPs 10, 14 will be arranged to both transmit and receive signals, but only one-way communication will be described here for the sake of clarity.

For a conventional mobile network the output 22 of the first SAP 10 will transmit the signal as a radio signal, and the network 12 will include a number of base stations for transmitting and receiving the radio signals, and a telephone network to which the base stations are connected.

Figure 2:
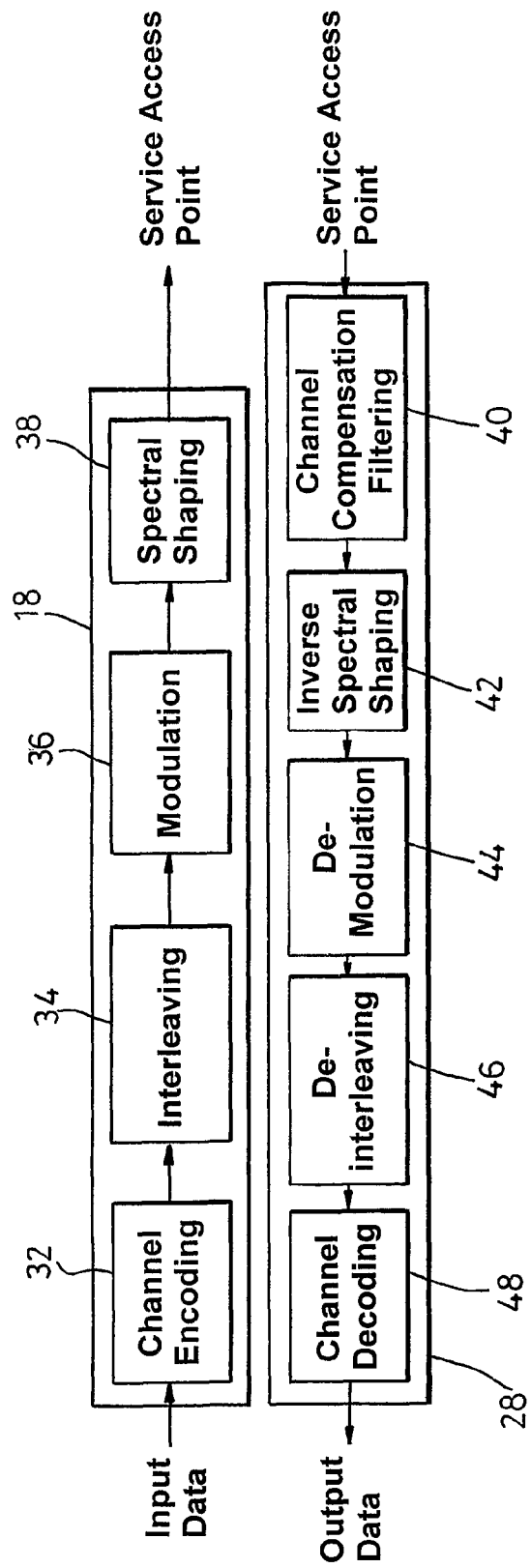
FIG. 2 is a diagram showing functions of a modulator and demodulator of the system of FIG. 1.

Referring to FIG. 2 the data modulator system 18 includes a number of modules arranged to perform a number of functions on the input data 17. These are a channel encoding module 32, an interleaving module 34, a modulation module 36 and a spectral shaping module 38. The data demodulator system 28 includes a number of modules that process the received modulated waveform. These include a channel compensation filter 40, an inverse spectral shaping module 42, a demodulation module 44, a de-interleaving module 46 and a channel decoding module 48.

The channel coding carried out by the module 32 can be of any suitable form, such as block coding, convolutional coding or turbo coding. Different useful data throughputs are derived using different rate codes and puncturing according to the desired bit error rate (BER). As is well known, channel coding generally works by adding redundancy into the data before transmission, so that if some bits of the transmitted signal are lost during transmission, the original data can still be extracted.

The output from the channel coding module 32 comprises a sixty bit frame every 20 ms. The modulator 36 is arranged to separate each sixty bit frame into 5 ms frames each carrying fifteen bits, producing four symbols from each channel coding frame. In this example the interleaving process operates on each sixty bit frame. The sixty bits of the frame are entered into a table having four rows of fifteen columns as follows:

| 1 | 5 | 9  | ... | 57 |
|---|---|----|-----|----|
| 2 | 6 | 10 | ... | 58 |
| 3 | 7 | 11 | ... | 59 |
| 4 | 8 | 12 | ... | 60 |

The array is then read in rows, giving the following sequence:

1,5,9 . . . 57,2,6,10 . . . , 59,4,8,12 . . . , 60.

The bits are then fed into the modulator in this revised order, and the first fifteen bits of this sequence are used to produce the first symbol, the second fifteen bits to make the second symbol. The third and fourth symbols are made from the third and fourth groups of fifteen bits.

The deinterleaving module 46 of the demodulator system 28 carries out the reverse of this process on the received bit stream from the demodulator, inputting the bits into the table one row at a time, and extracting them one column at a time. The advantage of the interleaving process is that, if one symbol is incorrectly demodulated and has errors in it, the errors will be spread out in the bit stream to the channel decoder module 48. This generally results in more accurate decoding of the data bits than if the erroneous bits are in a group.

Figures 3, 4:
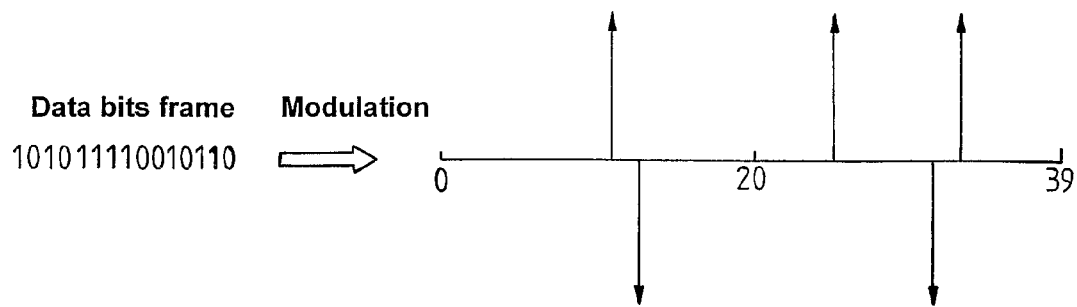
FIG. 3 is a diagram illustrating a method of modulation of data in the system of FIG. 1.
FIG. 4 is a table used in the method of FIG. 3.

Referring to FIG. 3, each fifteen bit frame input to the modulation unit 36 is converted to a symbol comprising a segment of modulated waveform signal. Each symbol is 5 ms long with an 8 kHz sampling rate, and therefore contains forty samples. The fifteen bit data frame is divided into groups of bits, in this case five groups of three bits, and each group of bits is used to define one or more parameters of a respective feature of the modulated waveform signal. In this case each group of bits defines the sample position of a respective pulse in the waveform signal.

Referring to FIG. 4, the forty samples of the symbol are divided into five tracks, each track including eight of the sample positions. The positions in each track are not adjacent, but are spread through the symbol at equal intervals. In this case the first positions of the five tracks are positions "0" to "4" respectively, and the positions in each track are spaced apart from each other by five positions. For example, the first track includes positions "0", "5", "10", "15", "20", "25", "30" and "35" as can be seen from FIG. 4. Each track is allocated to a respective group of bits in the fifteen bit data frame. Here the first track is allocated to the first three bits, the second track to the second three bits and so on. For each track, a pulse is produced on one of the eight positions only, and the selected position carries the three bits of data associated with that track, as shown in the bottom row of FIG. 4. As there are eight positions in each track, each position can carry three bits of data, as there are eight possible combinations of the group of three bits.

In the example shown the first three bits of the sequence are "101", and the position on the first track allocated to the data bits "101" is position "25". Therefore a pulse is produced at position "25" in the symbol. The remaining four groups of three bits are carried by pulses in positions "16", "32", "13" and "34" as shown, and pulses are therefore produced at each of those positions.

When the positions of all of the pulses in the symbol have been defined, the sign of the pulses is defined so that the sign alternates through the symbol. In this case every other pulse starting with the second is made negative, and the remaining pulses are left positive. Clearly the signs of all of the pulses could be inverted so that the first pulse was negative. Finally the complete waveform is multiplied by a preferred gain factor so that the signal is suitable for onward transmission. The symbols are transmitted in sequence to produce a continuous modulated waveform signal.

Figure 5A:
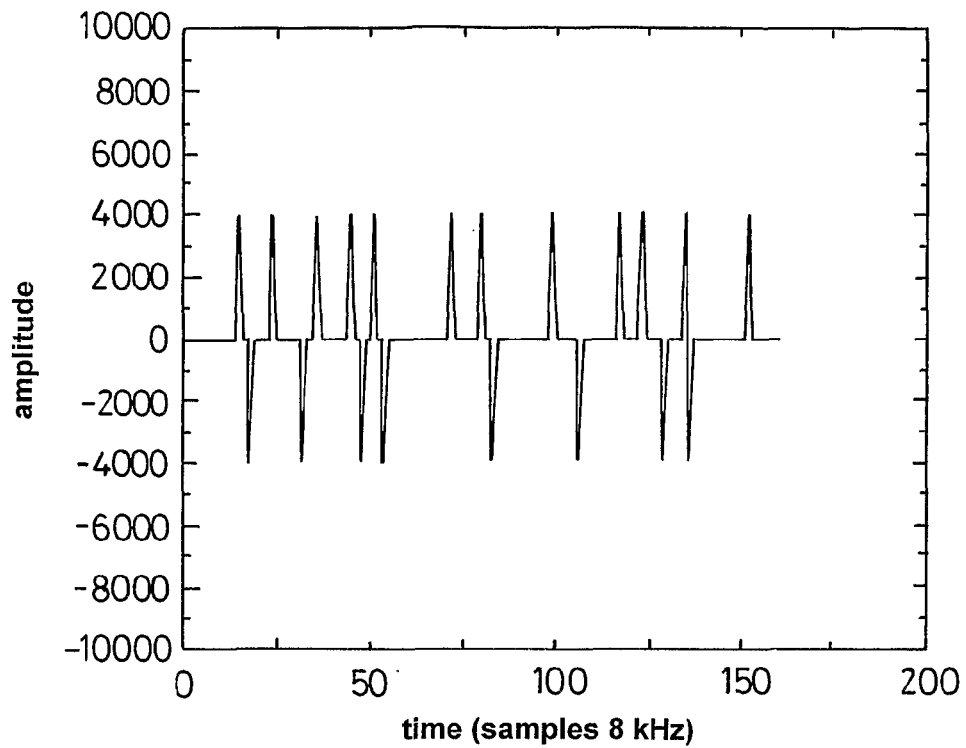
FIG. 5a shows a segment of a waveform signal produced by the method of FIG. 3.
Figure 5B:
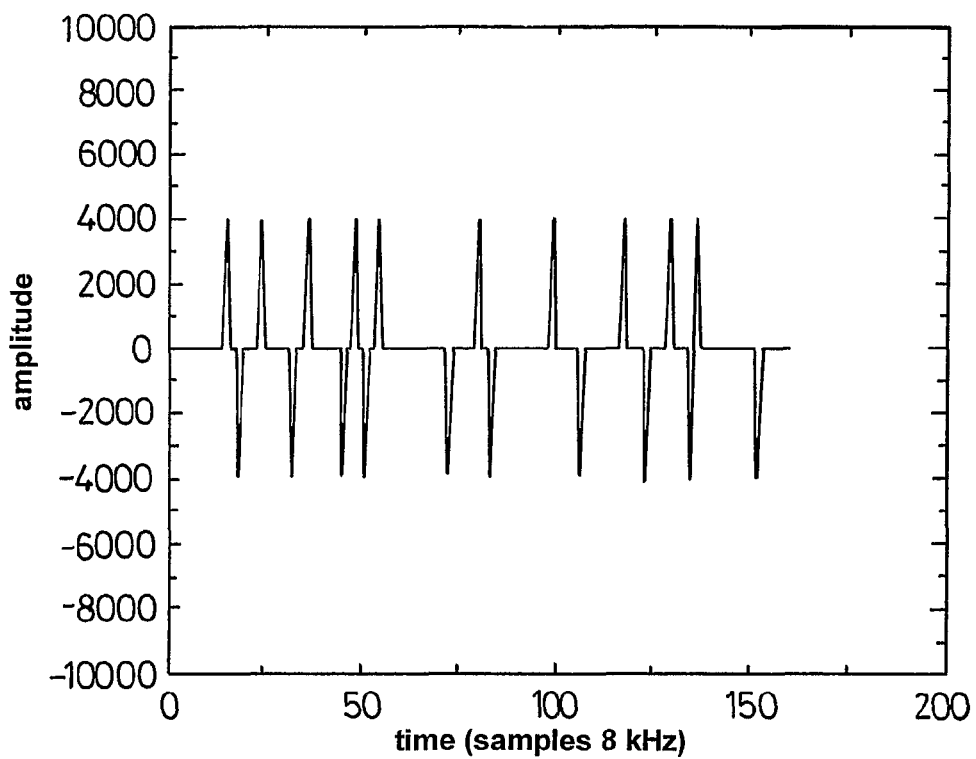
FIG. 5b shows a segment of a waveform signal produced by a modification of the method of FIG. 3.

Referring to FIG. 5a the waveform signal comprises a series of pulses of alternating sign, as produced by the modulation unit 36. In this example the pulses are in symbols of five, and the first and last pulse of each symbol is the same sign, i.e. positive. This results in two adjacent pulses of the same sign at the join between each adjacent pair of modulated symbols. In an alternative arrangement shown in FIG. 5b, the sign of the first pulse in each symbol alternates from one symbol to the next, so that the pulses alternate in sign through the complete modulated signal.

In a modification to this method, the modulated symbols are reorganized so that the symbols close or similar to each other also have similar data bit patterns, i.e. close hamming distances. If a symbol is wrongly demodulated, it is more likely to have been confused with another symbol that is similar to it. Assigning similar bit patterns to similar symbols minimizes the demodulation bit errors.

Figure 6:
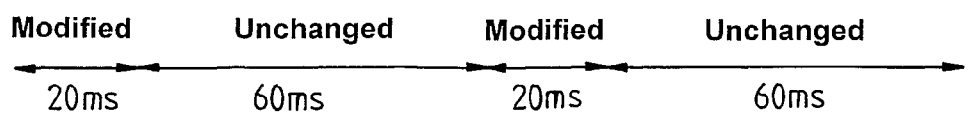
FIG. 6 is a diagram showing modification of modulated waveform in the system of FIG. 1 to include characteristics so that the signal passes through Voice Activity Detectors (VAD)

After modulation the waveform signal is further modified by the spectral shaping module 38. This is to ensure that the spectral shape of the signal varies over time so that any voice activity detector (VAD) on the voice channel will not identify any parts of the transmitted signal as a non-speech and cut them out of the transmission. As shown in FIG. 6, the spectral shaping module 38 modifies only parts of the modulated waveform, in this case modifying a 20 ms section out of each 80 ms section of the waveform. This leaves the remaining 60 ms sections unchanged, thereby producing the required variation in spectral shaping.

Figure 7:
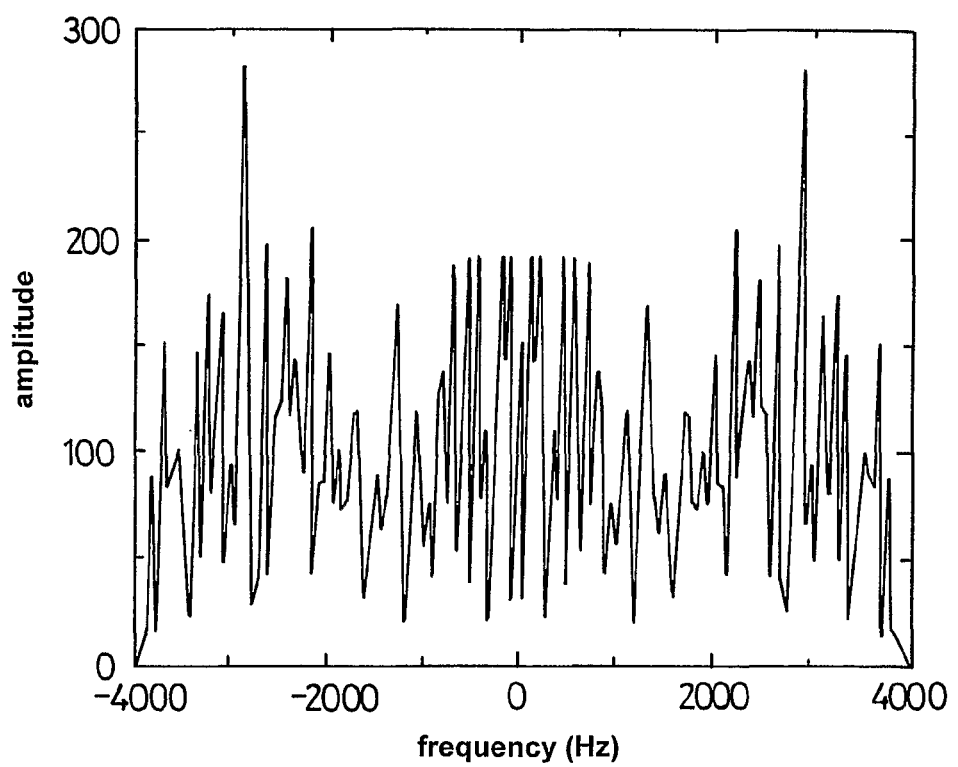
FIG. 7 is a graph of the spectrum of the signal segment of FIG. 5*a;*
Figure 8:
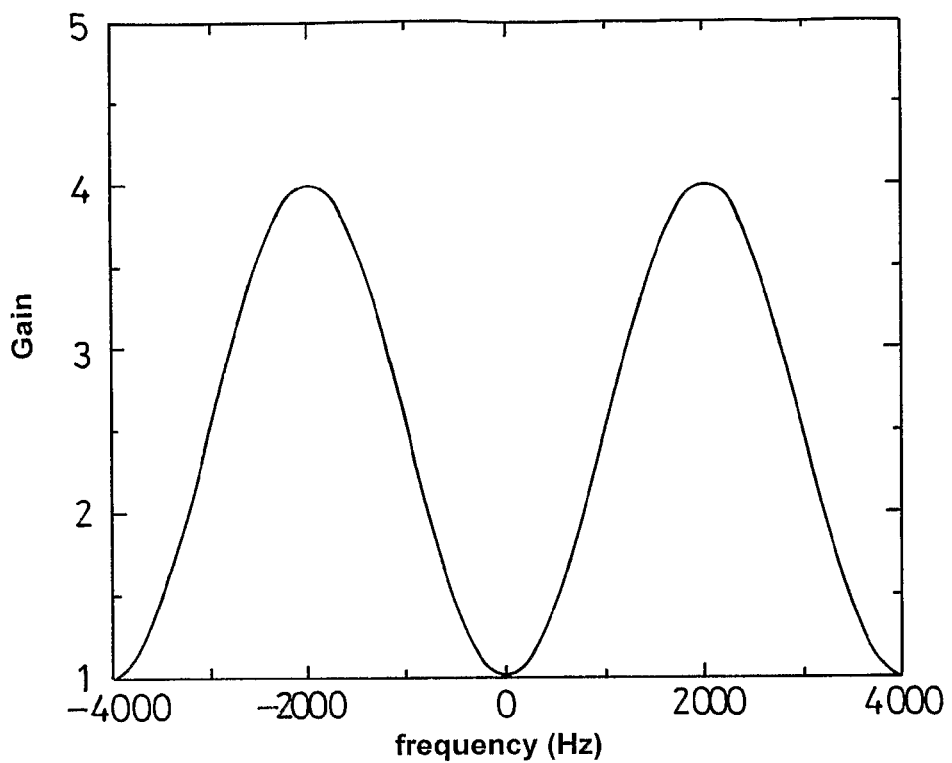
FIG. 8 shows a spectral shaping function used to modify the waveform segment of FIG. 5*a;*
Figure 9:
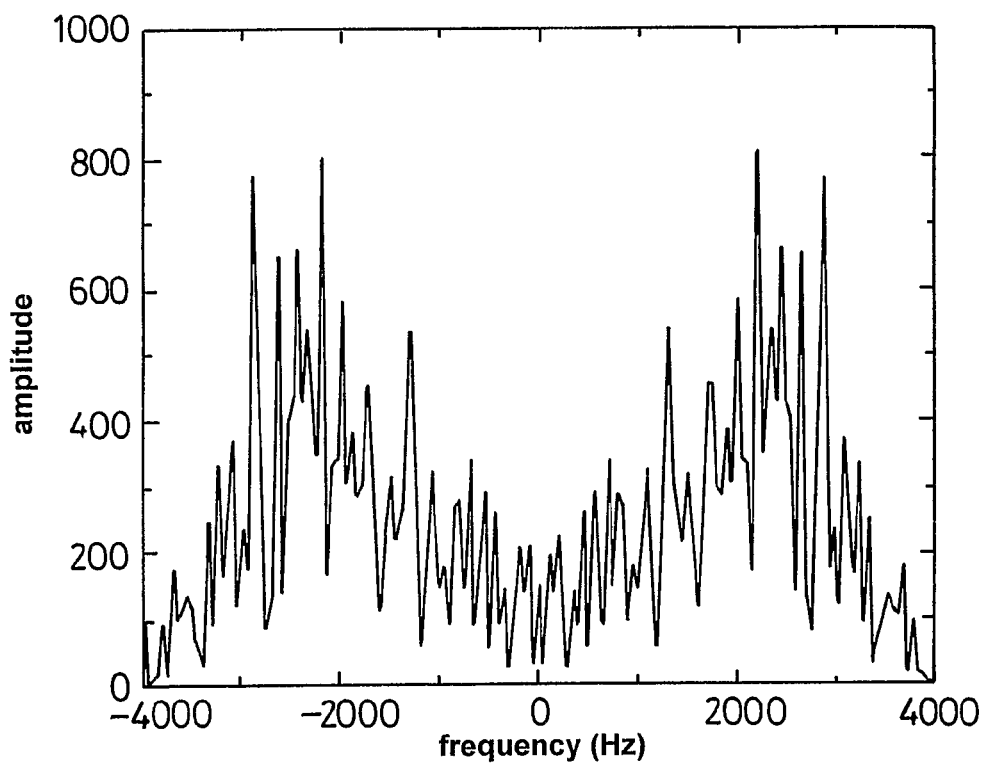
FIG. 9 is a graph showing the spectrum of the modified signal segment corresponding to FIG. 5*a;*

If the frequency spectrum of the waveform signal of FIG. 5a is analysed, it can be seen to have the form shown in FIG. 7. The spectral shaping module 38 generates a spectral shaping function as shown in FIG. 8 that applies a gain that varies with frequency to the frequency components of the waveform signal. The gain in this case varies in a sinusoidal manner with frequency between a minimum of "1" at 0 Hz, −4000 Hz and +4000 Hz, and a maximum of "4" at −2000 Hz and +2000 Hz. When the spectrum of the waveform signal is multiplied by this shaping function, its frequency spectrum is modified to the form shown in FIG. 9. As can be seen this is a multiplication of the original frequency spectrum of FIG. 7 and the smoothly varying frequency spectrum of FIG. 8. This spectrum is therefore significantly different from that of the unmodified modulated signal. The result is that the spectral shape of the signal varies once every 80 ms, and this variation is enough to ensure that a VAD will not cut the signal off.

Figure 10A:
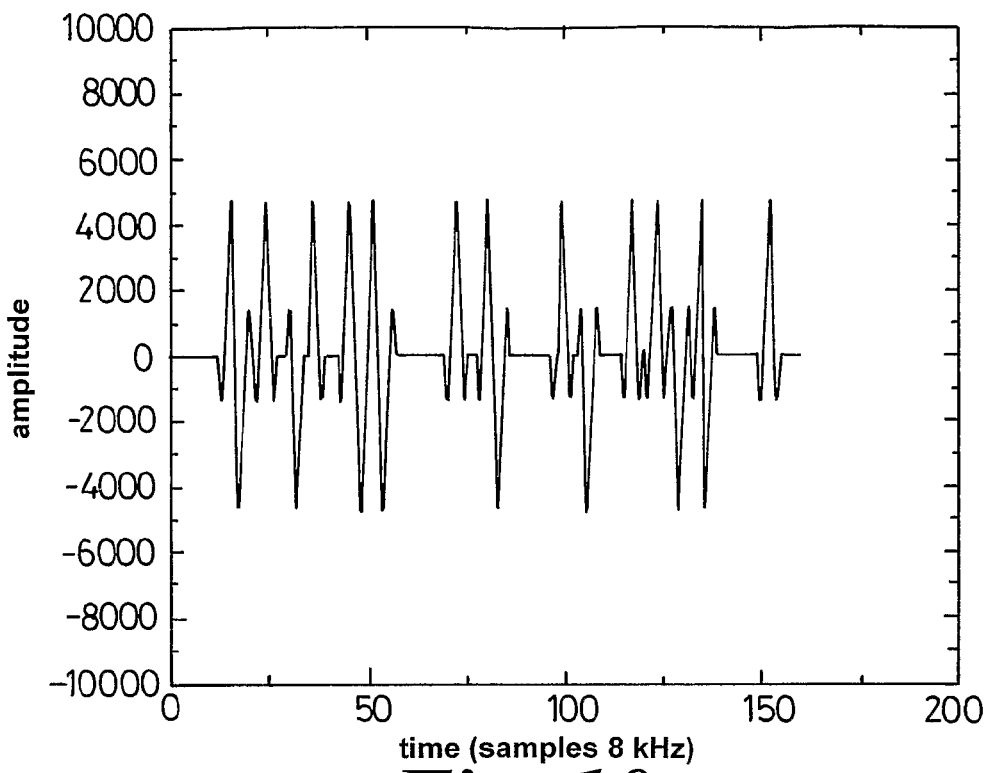
FIG. 10*a* shows the waveform segment of FIG. 5*a* after it has been modified.
Figure 10B:
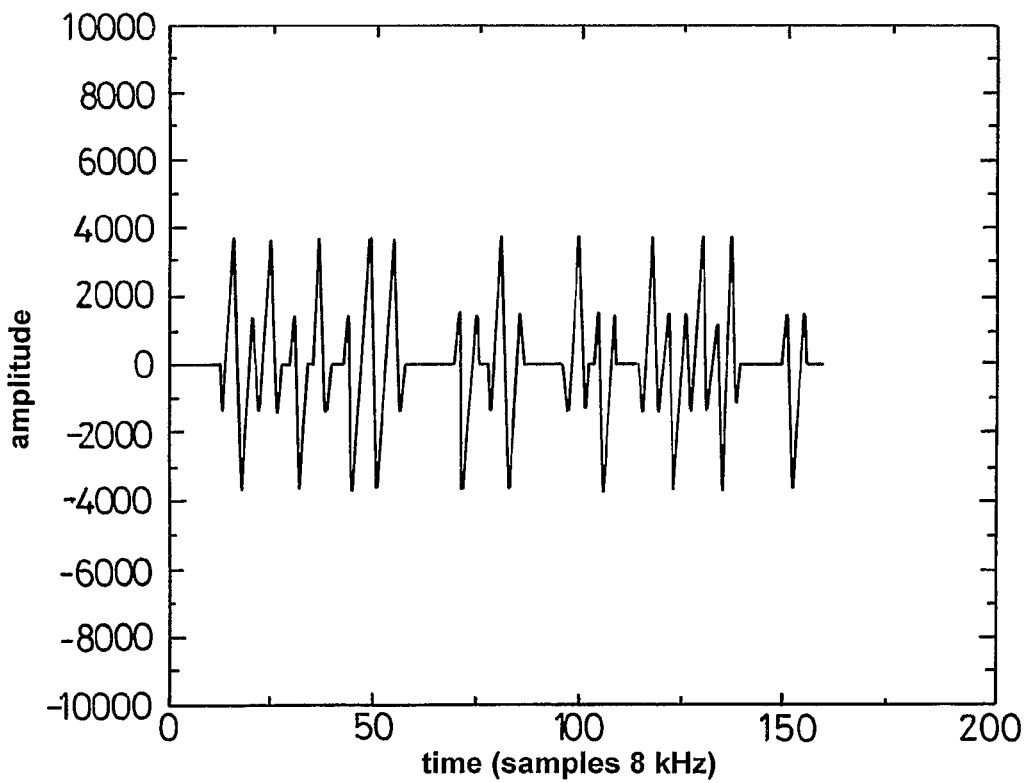
FIG. 10*b* shows the waveform segment of FIG. 5*b* after it has been modified.

This frequency spectrum is then inverse transformed and normalized, producing a waveform as shown in FIG. 10a. As can be seen, this modified waveform is in fact very similar to the original waveform of FIG. 5a, except that each of the pulses, both positive and negative, has been replaced by a feature having the shape shown in FIG. 11. This comprises a central peak in the same position as the original pulse, and having the same sign, and two side peaks, one on each side of the central peak, that are of smaller amplitude than the central peak and of opposite sign. The waveform of FIG. 5b, if modified in the same way, produces a waveform as shown in FIG. 10b.

Figure 11:
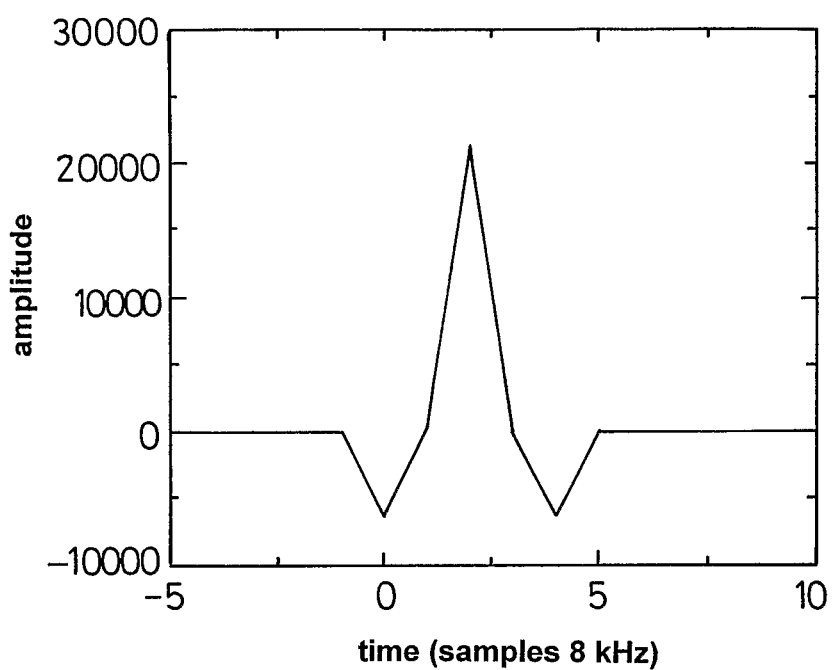
FIG. 11 shows a pulse shaping function that can be used in place of the frequency transforms of FIGS. 7 to 9.

In practice the spectral shaping module 38 can be greatly simplified by performing time domain filtering or a convolution operation such that each single pulse from the waveform signal is replaced by a feature having the shape shown in FIG. 11. This avoids the need for the frequency transformation, modification, and reverse transformation described above. In a further simplification the spectral shaping function 38 may be integrated with modulation 36 so that the required feature shape is placed in the created symbols when necessary.

It should also be noted that other forms of modification can also be used in addition to, or instead of, the spectral shaping described above. The aim of this modification is to produce a signal with varying features so that it varies over time, thereby overcoming the possible cutting off of a VAD. For example the amplitude of the waveform may be modified so that the energy contour of the waveform signal varies.

Once the waveform signal has been shaped by the spectral shaping module, it is output as the waveform signal 19 by the modulator 18, and then input to the speech compression module of the first SAP. The speech compression module operates by identifying various parameters of the waveform signal 19 and coding those parameters. The compressed signal that is transmitted across the network therefore transmits those parameters. When the compressed signal has been transmitted over the network 12 the speech decompression unit in the second SAP 14 uses the transmitted parameters to decode the original waveform signal.

When the decoded waveform signal is input to the demodulator 28 from the speech decompression module of the second SAP 14, it is passed through the channel compensation filter 40. The function of this filter is to counteract the response of the entire communications link between the modulator 18 and the demodulator 28. The public mobile or fixed telephone voice channels have their own characteristic impulse response, which may include the responses of any frequency shaping filters at the transmitter and receiver ends. This impulse response includes a spreading effect on the pulses of the modulated signal. The filter 40 is therefore arranged to have a response that is the inverse of the response of the telecommunication system, which will therefore sharpen and restore the signal closer to the original modulated signal. This improves the accuracy of the demodulation.

Figure 12:
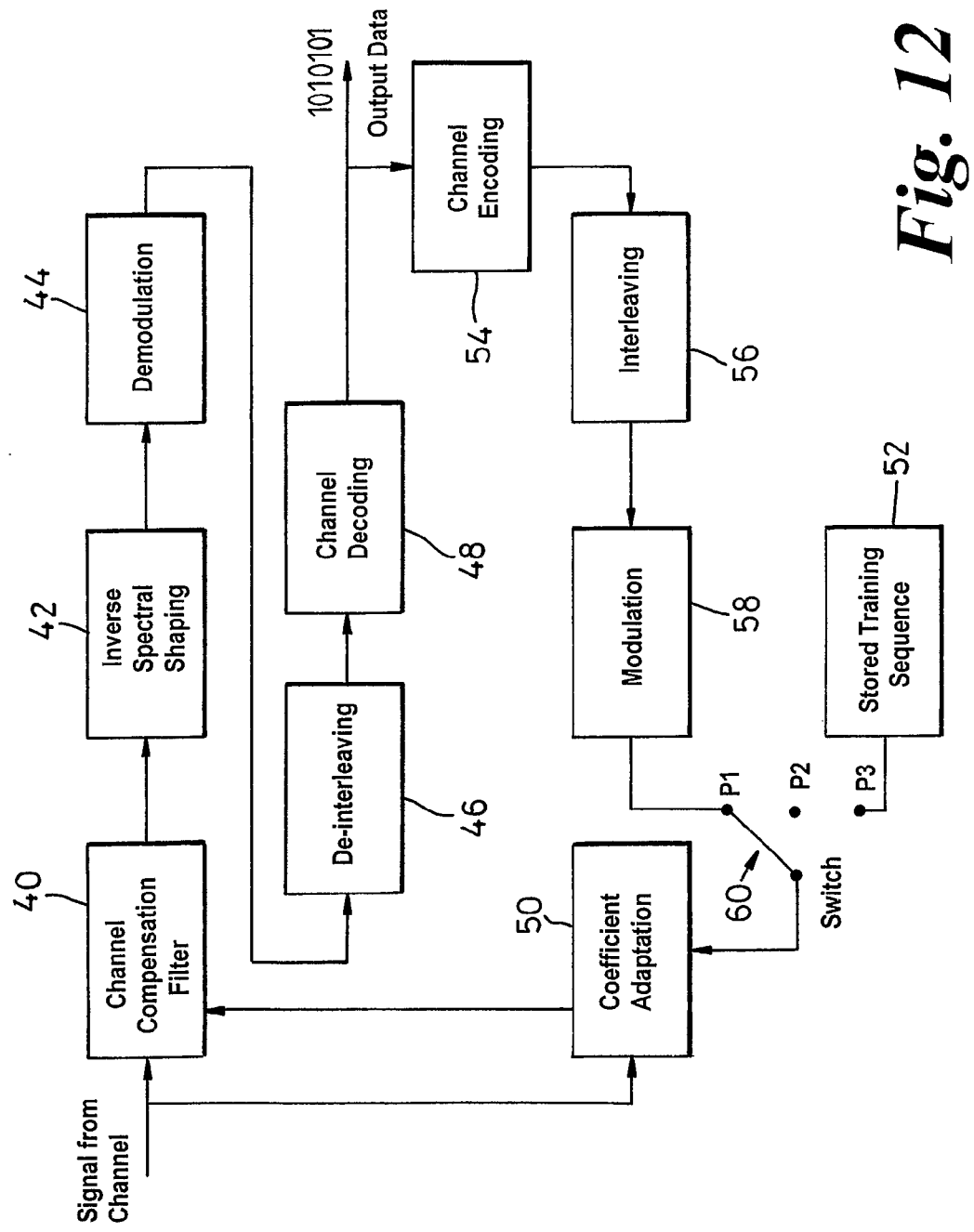
FIG. 12 is a diagram showing an adaptive channel compensation filter used in the system of FIG. 1.

Referring to FIG. 12, the filter 40 is arranged to receive the decompressed signal, filter it using a number of filter coefficients, and transmit it on, via the inverse spectral shaping module 42 to the demodulation module 44. The demodulation module 44 demodulates the pre-processed waveform, in the inverse of the process of the modulator, to recreate the bit stream input to the modulation unit 36, as will be described in detail below. This bit stream is then processed in the deinterleaving module 46 and the channel decoding unit 48 to produce the output bit stream as described above.

The filter 40 is an adaptive filter, and its filter coefficients are adapted by a coefficient adaptation module 50. This coefficient adaptation module 50 receives the modulated waveform signal from the channel and compares it to a reference signal to determine whether and in what way the filter coefficients need to be adapted. The filter adaptation is carried out in two stages. In the first stage, the first modulator unit 18 is arranged to transmit a predetermined training sequence, and the coefficient adaptation module 50 compares the received signal with a pre-stored reference signal, stored in memory 52, that is the same as the transmitted training sequence. The coefficient adaptation module 50 is connected to the memory 52 by a switch 60. This allows it to set the filter coefficients to suitable initial values.

Once the training sequence is finished and the initial filter coefficients have been estimated, the switch 60 may be switched either to position P2 which suspends adaptation. This may be suitable if the voice communication channel response is time invariant. However, if the voice communication channel response varies with time, then the switch is switched to position P3 and the adaptation module 50 switches to a continuous adaptation mode. In this mode the reference signals are generated from the decoded output data bit stream. The output data is channel encoded in a local channel encoding module 54, and interleaved in a local interleaving module 56, and then modulated in a local modulation module 58, which is connected to the coefficient adaptation module 50 by the switch 60. These modules operate in the same manner as the corresponding modules in the modulator 18 at the first SAP 10. Therefore, assuming the output bit stream has been correctly decoded, the reference signal will be identical to the modulated waveform produced by the modulator 18 at the first SAP 10. The adaptation module 50 can therefore continuously adapt the filter coefficients to compensate for any variation in the channel response.

If at any time during transmission the reference signal cannot be generated accurately, then the switch is returned to position P2 and coefficient adaptation is suspended.

Figure 13:
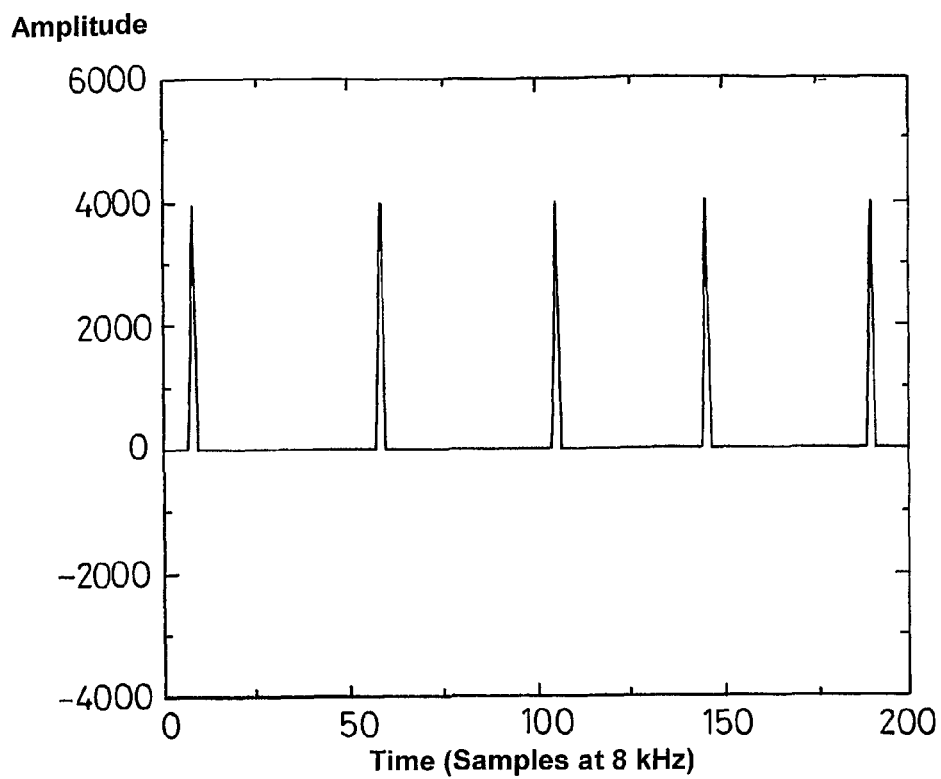
FIG. 13 is a graph showing synchronization pulses sent by the transmitter of FIG. 1.
Figure 14:
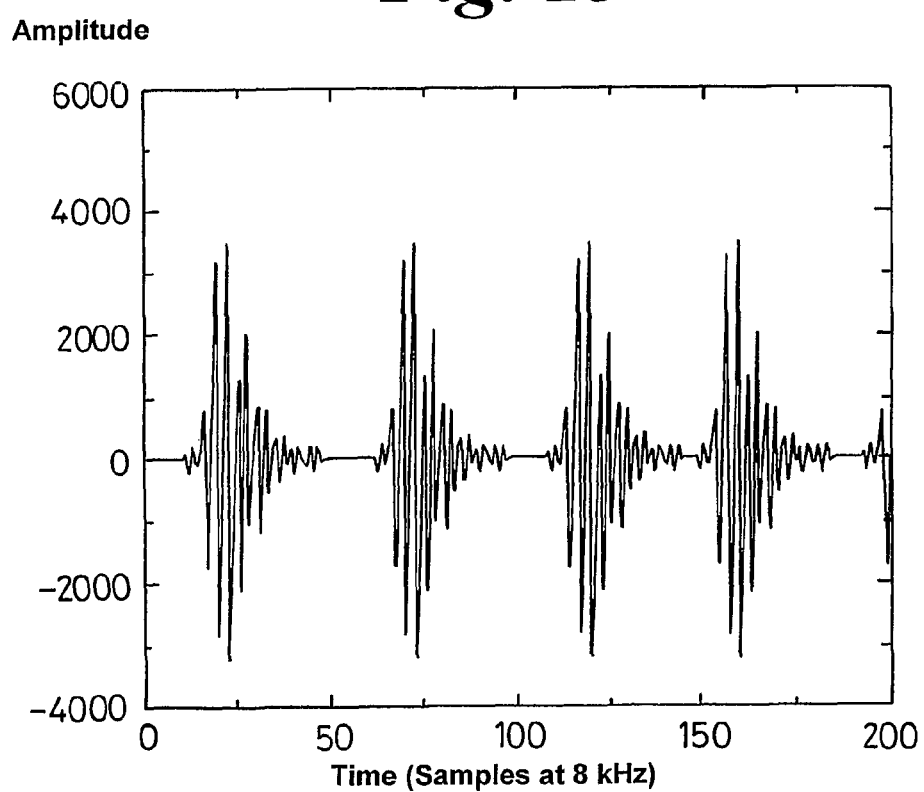
FIG. 14 is a graph showing the form in which the signal of FIG. 13 is received at the demodulator of FIG. 1 after transmission over the network.
Figure 15:
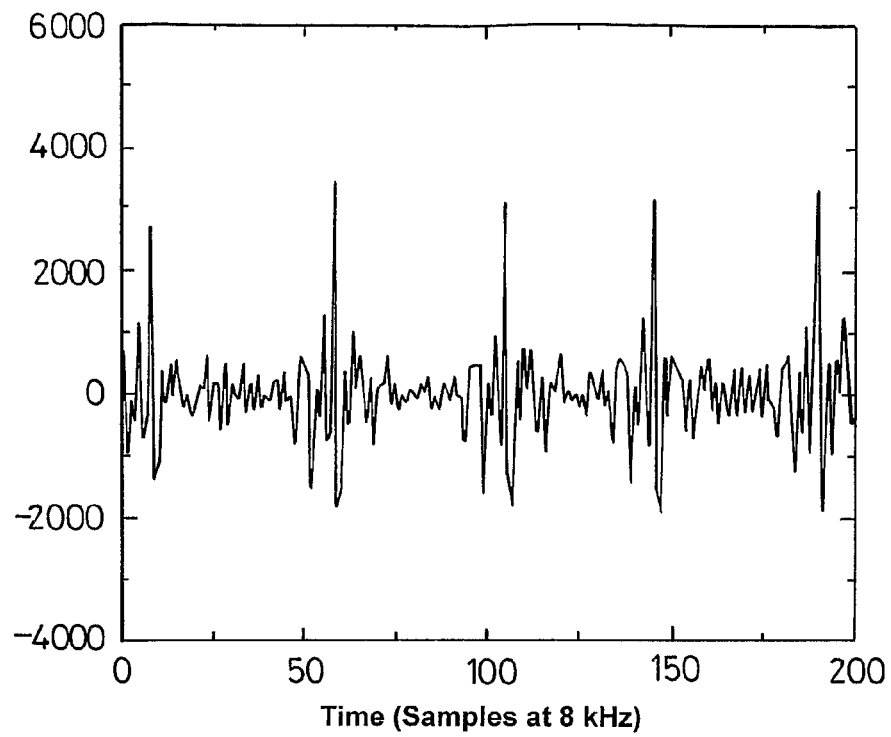
FIG. 15 is a graph showing the signal of FIG. 14 after filtering by the channel compensation filter of FIG. 1.

At the start of any communication a synchronization signal is sent from the modulator 18 to the demodulator 28 so that the transmitted signal can be interpreted. Part of this synchronization signal is shown in FIG. 13 and comprises a number of pulses at different predetermined time intervals. When these synchronization pulses are received at the filter 40, the communication link response gives, for example, the result shown in FIG. 14. As can be seen, each pulse of the synchronization signal has been changed so that it no longer has a single pulse characteristic. After the received signal has been passed through the filter 40, it is modified back to a form closer to the original signal, as shown in FIG. 15. The synchronization sequence is filtered by the filter 40 using a fixed set of coefficients representing the average inverse response of the target voice communications link. In this case it can be seen that the signal includes a number of pulses of significantly greater amplitude than the rest. These are the actual pulses from the originally transmitted signal that have been enhanced so that they can be distinguished. This enables the synchronization signal to be recognized, and therefore enables synchronization of the modulator and the demodulator to be performed.

Figure 16:
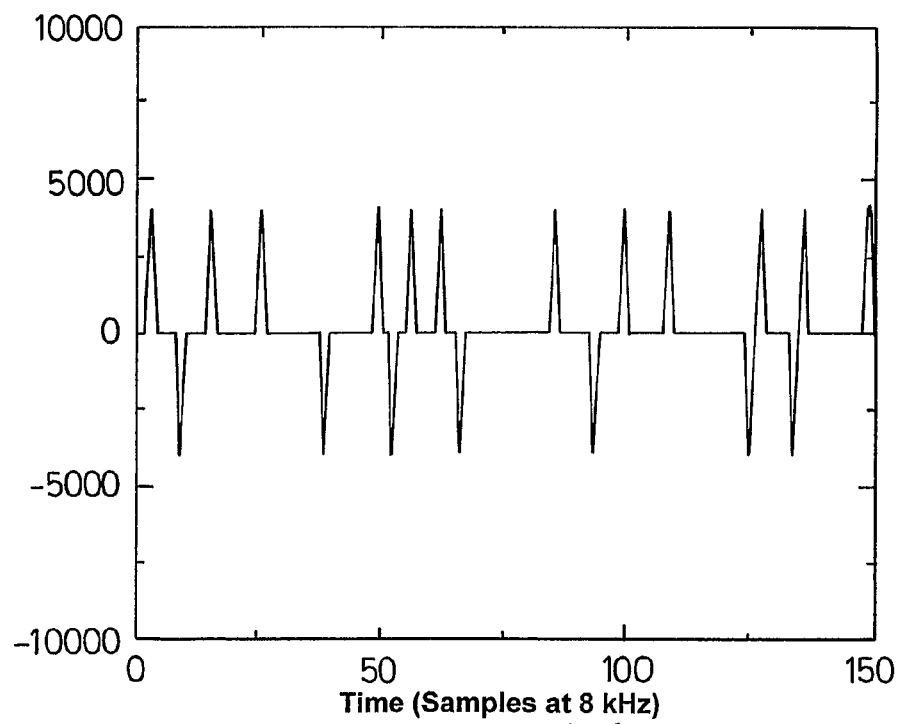
FIG. 16 is a graph showing a data carrying modulated waveform signal sent by the modulator of FIG. 1.
Figure 17:
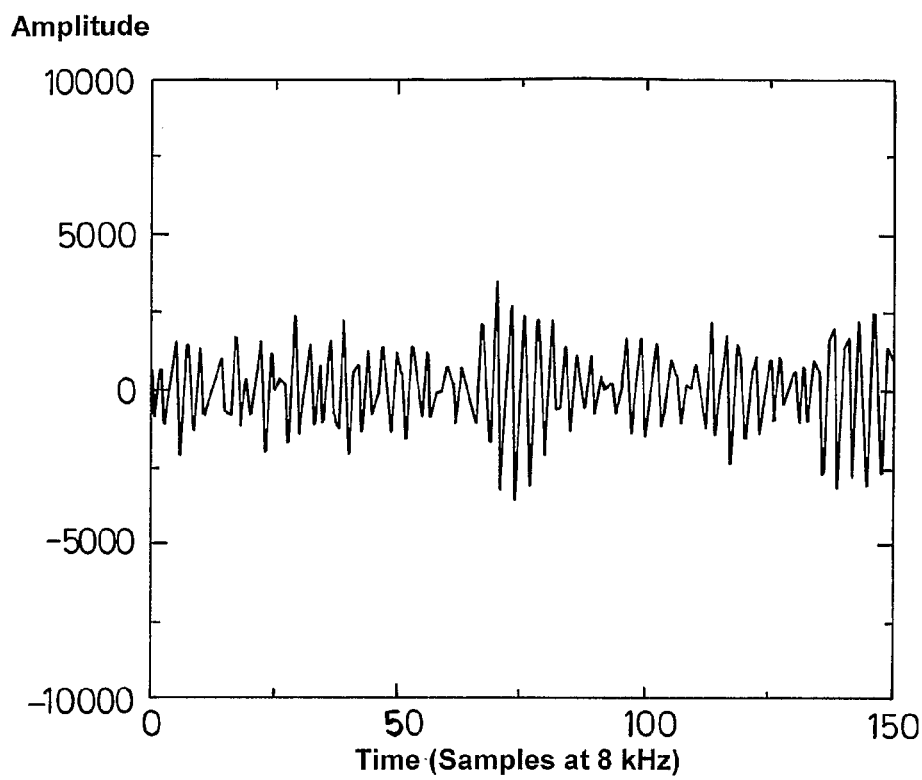
FIG. 17 is a graph showing the form in which the signal of FIG. 16 is received at the demodulator of FIG. 1 after transmission over the network.

Then when the data-carrying waveform is transmitted over the network, the original waveform signal has a form such as that shown in FIG. 16. This is in the same format as that shown in FIG. 5a and includes a number of symbols of five pulses, with the pulses in each symbol being of alternating sign. In this case this signal, when received and input to the filter 40, has the form shown in FIG. 17. It can be seen that the pulses of the original signal cannot be recognized. After filtering by the filter 40, the signal has the form shown in FIG. 18, in which the pulses of the original signal can be identified. Once initial synchronization has occurred, the training sequence and then the data is transmitted as described above.

Referring back to FIG. 2, the output from the channel compensation filter 40 is passed through the inverse spectral shaping module 42. This performs a function that is the inverse of the modification performed by the spectral shaping module 38. This removes the added modifications so that the signal input to the demodulation module 44 is as close as possible to the output from the modulation module 36.

Figure 18:
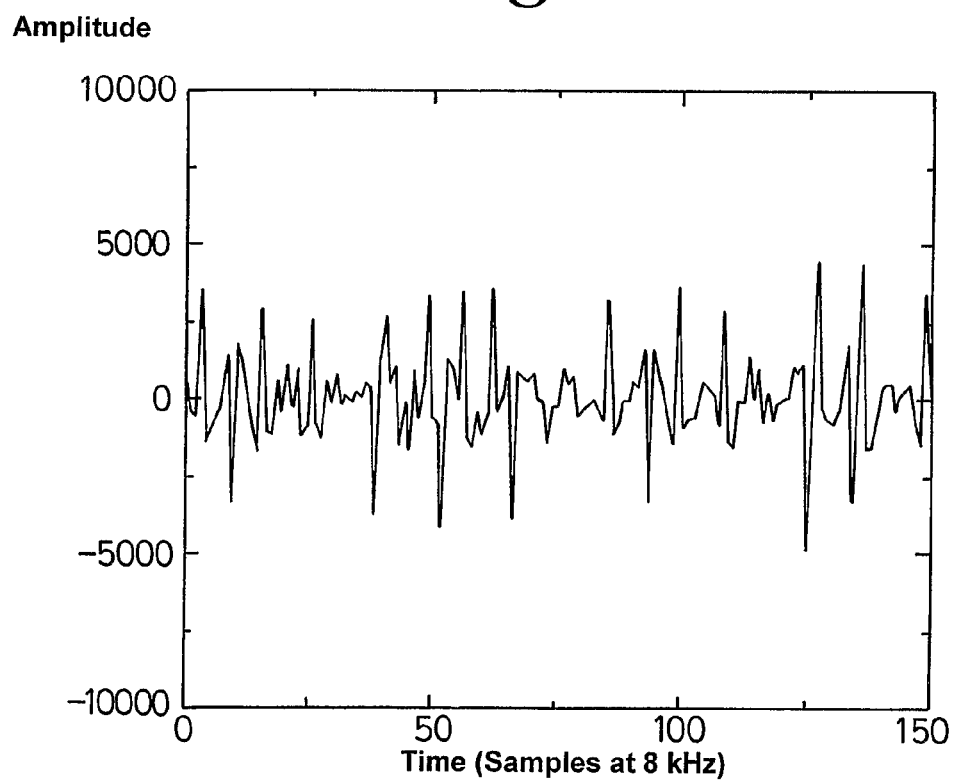
FIG. 18 is a graph showing the signal of FIG. 17 after filtering by the channel compensation filter of FIG. 1.

The demodulation module 44 carries out a demodulation process on the signal it receives, the result of which is essentially the inverse of the modulation process carried out in the modulation module 36, as described above and shown in FIGS. 3 and 4. However, while the inverse of the modulation process could be used, the demodulation is actually carried out by comparing the received signal symbols with a number of reference signals. The received modulated waveform signal, which has been filtered by the channel compensation filter and undergone inverse spectral shaping and therefore resembles the signal shown in FIG. 18, is received, and the separate symbols identified. For each symbol the waveform is compared with reference waveforms and a matching metric determined for each reference waveform that indicates how close it is to the received waveform. This metric is used to identify the reference waveform that is closest to the received waveform. There is a separate reference waveform for each possible combination of the fifteen bits in the symbol. The bits corresponding to the selected reference waveform are then output by the demodulation module. Each possible waveform shape for each symbol has a corresponding unique data bit pattern. As there are fifteen bits in each symbol, there are $2^{15}$ i.e. 32768 possible reference waveform shapes or symbols. The inverse spectral shaping 42 may be integrated with demodulation 44 by using the required feature shape in the reference symbol waveforms when necessary.

The interface between the modem and the service access point of the chosen telecommunications system could be digital or analog. Also there may be analog sections within a telecommunications system. These analog sections may cause two problems. The sampling instances received by the demodulator may be different to those sent by the modulator, due to a constant phase shift in the Digital to Analog and Analog to Digital Converter (DAC and ADC) timing pulses. Second the clock frequencies of the DAC and ADC may be slightly different, which results in stretching or shrinking of the signal, in addition to losing the sampling instances.

The channel compensation filter 40 can compensate and realign a mismatch up to few samples and synchronize the filter output to the exact sample location with respect to the reference signal. This does not cause any adverse effects or degrade the performance of the channel compensation filter, since this effect is time invariant once a voice channel has been established. However, to prevent a larger mismatch from building up due to different clock frequencies, the lag between the pre-processed signal and the reference signal is measured and corrected for.

The clock rate variations are detected by estimating the lag corresponding to the maximum cross correlation between the output of the channel compensation filter 40 and the reference signal. When the data is transmitted and the reference signal is locally generated at the demodulator 28, in order to avoid losing synchronization, the cross correlation lag is estimated with fractional sample accuracy. This helps tracking the clock rate variations smoothly and avoids sudden loss of synchronization. The fractional sample estimates can be obtained by up sampling the reference and the filter output to a higher sample rate, measuring the lag to the nearest number of samples, correcting the lag, and then down sampling to the original sample rate.

The fractional lag correction is carried out before the channel compensation filter coefficient adaptation. This avoids the filter trying to model the shrinking or stretching effect of the received signal and degrade the performance of the filter. This is achieved by correcting the alignment of the channel signal and the reference signal according to the detected lag. This correction is achieved by up sampling either the channel signal or the reference signal, correcting for the lag, and down sampling with the correct lag. Tracking the clock rate variations at a higher sampling rate also helps to make the lag corrections faster than the coefficient adaptation, hence to avoid the filter modeling the clock rate variations.

There are instances when the difference in the matching metric, for the best matching and for one or more other symbol waveform patterns is small. Soft decision considers those close matches and improves the channel decoder performance. The demodulator estimates a weight for each bit, rather than a hard decision of being one or zero. The channel decoder uses the weight values to estimate the best possible decoded output bit stream.

Each modulation/demodulation symbol has a corresponding unique data bit pattern. E.g. fifteen bits per symbol producing $2^{15}=32768$ symbols for all the possible bit patterns. The demodulator is arranged to find a weight value for each of the fifteen bits of a received symbol, i.e. fifteen separate weight values for the fifteen bits.

For a received symbol the demodulator compares it with all the possible reference symbols and estimates a similarity measure "$s_i$" for each reference symbol:

$$s_i \, (0 \leq i \leq 32767)$$

For example this similarity measure may be a function of the cross-correlation or the mean squared error between the received symbol and the candidate reference symbol. The estimated weight value for a particular bit position "j" is given by:

$$w_j = \sum_{i=0}^{i=32767} n_{i,j} \times s_i \quad (0 \leq j \leq 14)$$

Where $n_{i,j}$ is "+1" if the $j^{th}$ bit of the $i^{th}$ reference symbol is one and "−1" if the $j^{th}$ bit of the $i^{th}$ reference symbol is zero. In other words the fifteen weight values are initialized to zero and each weight value is incremented or decremented by the similarity measure if the corresponding bit of the reference symbol used to estimate the similarity measure is one or zero. Then the weights are input to the channel decoder that uses them to estimate the value of each decoded data bit.

In the case of sub-optimum searches, where all the reference symbols are not used, the same principles are applied with the chosen search range of the reference symbols. A pre-processing algorithm will decide the candidate reference symbols.

The channel decoder may normalise the weight values as necessary. For example if four symbols correspond to one channel coding frame, the corresponding sixty weight values are normalized to fit into the soft decision quantizer range of the channel decoder. Each group of sixty weight values, corresponding to four symbols and a channel coding frame, is normalised independently.

In the embodiment described above the data is only carried in the positions of the pulses in the modulated waveform. However it will be appreciated that both the amplitude of each pulse, and the sign of each pulse, can also be used to carry the data. For example in a modification to the system shown in FIG. 3, each pulse is arranged to have two possible amplitudes, one being twice that of the other. The amplitude of each pulse is therefore used to carry one bit. This means that each track in the example shown carries four rather than three bits. In a further modification, the sign of each pulse is not set so that they alternate, but is chosen to carry a further bit. In this way the sign and the position are used to carry four bits of data.

Figure 19:
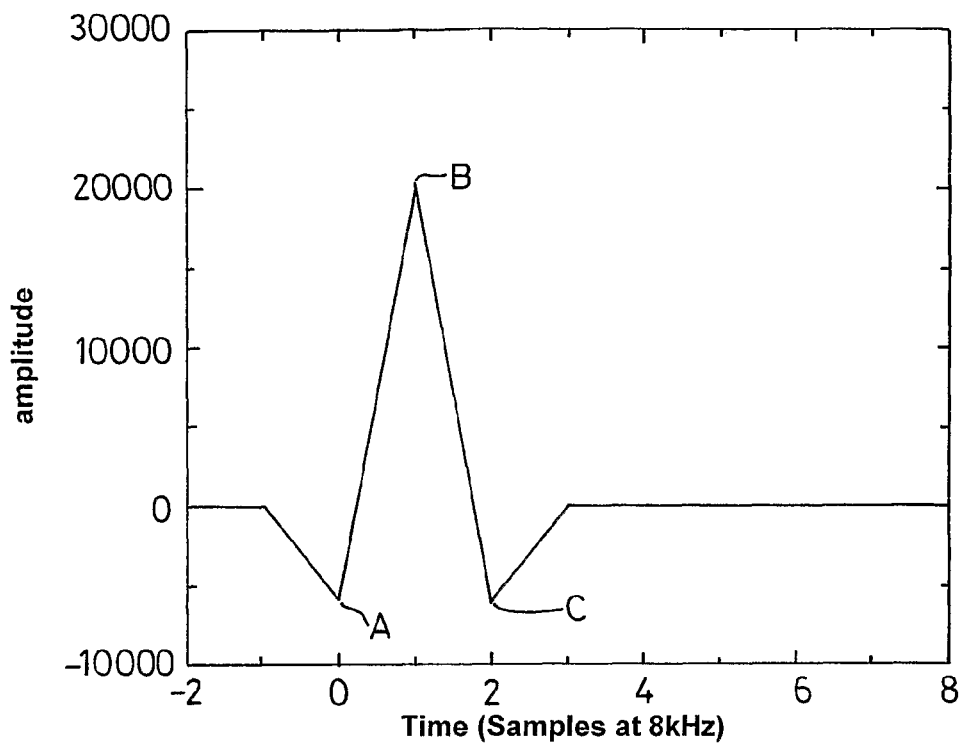
FIGS. 19 and 20 show modulated waveform features that can be used in place of the pulses of FIGS. 5*a* and 5*b*.
Figure 20:
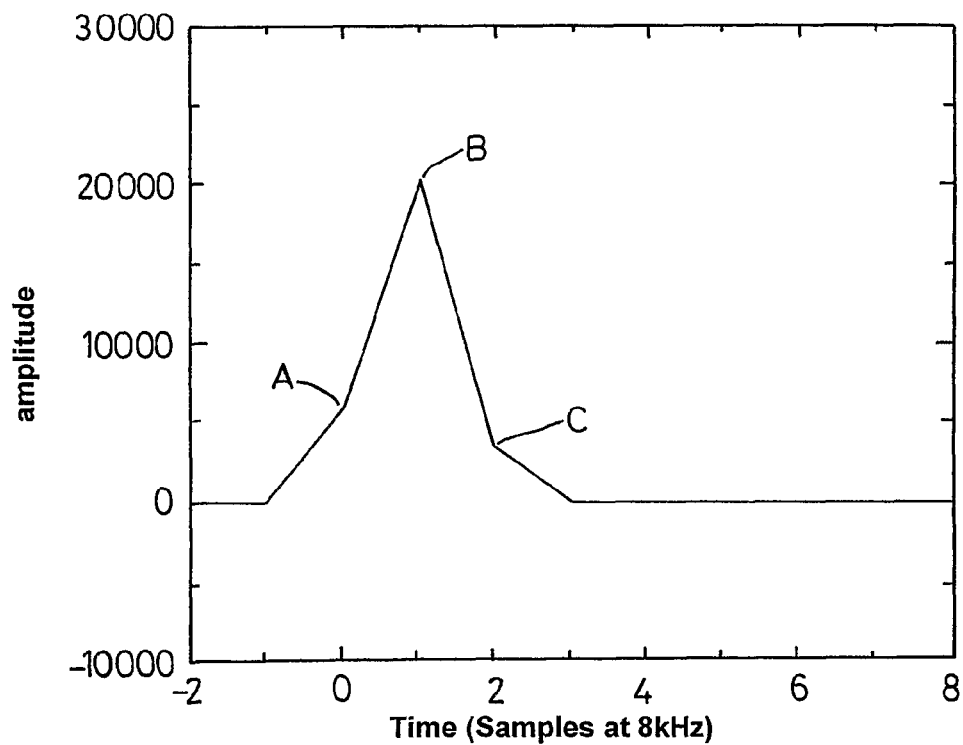

In further embodiments, rather than simple pulses, other features are generated in the waveform signal that carries the data. For example, the pulses of FIGS. 5a and 5b can each be replaced by features as shown in FIG. 19 or FIG. 20. In this case one or more of the position, sign, and amplitude of the feature can be used to carry the data in the same way as described above for pulses.

Figure 21:
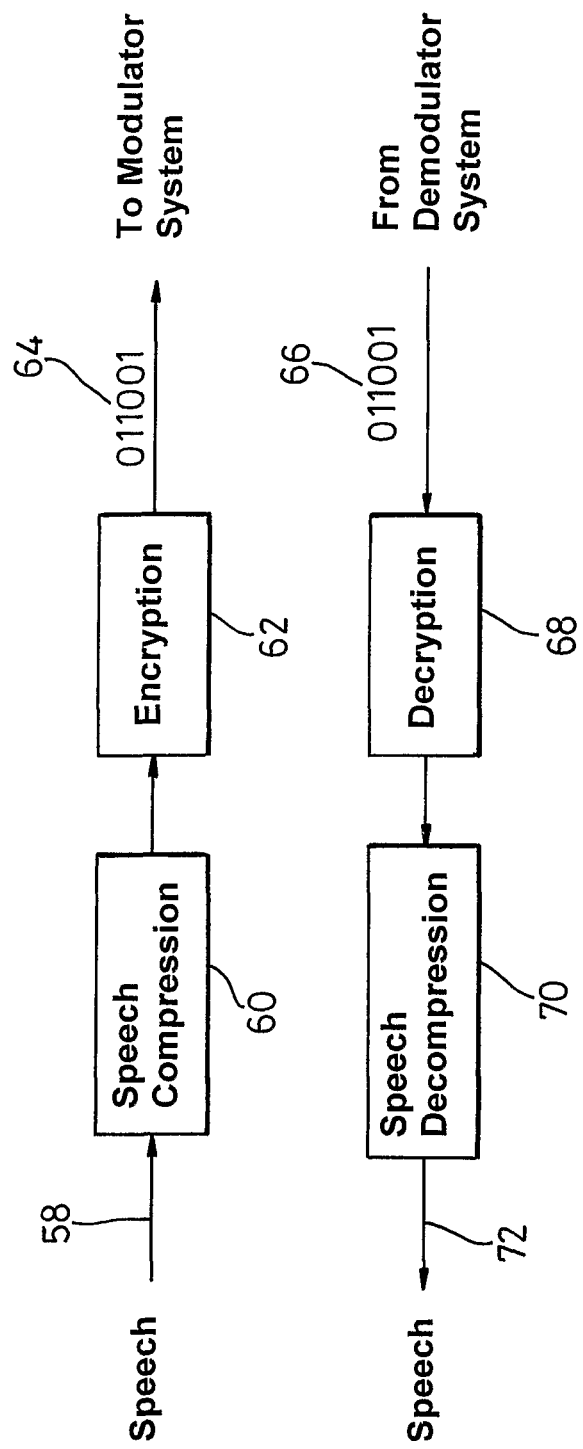
FIG. 21 shows an encrypted speech transmission system excluding the system of FIG. 1.

Referring to FIG. 21, in one embodiment of the invention the data transmission system described above is used as part of a speech based telecommunication system. Specifically, the whole system is arranged to receive a speech signal 58 that can be a digital or an analogue signal. The system comprises a speech compression module 60 arranged to perform a standard speech compression algorithm on the input signal, and an encryption module 62 that is arranged to encrypt the compressed speech signal. The output from the encryption module 62 is a bit stream 64 that is then used as the data input 17 to the modulator system 18 of FIG. 1. At the receiving end, the output data 29 from the demodulator system 28 forms a bit stream 66 that is input to a decryption module 68. The output of the decryption module is input to a speech decompression module 70, the output of which is a speech signal 72 corresponding to that 58 input to the system.

This system therefore provides a way of transmitting encrypted speech over a low bit rate voice channel.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for transmitting digital input data over a speech channel of a network, the system comprising:
   a modulator arranged to transform the digital input data to produce a modulated waveform signal resembling a speech signal, wherein the modulator is arranged, in transforming the digital input data, to convert the digital input data into a sequence of symbols, each of the symbols comprising a segment of the modulated waveform signal, and the modulator including a spectral shaping module that applies at least one of a periodic gain that varies with the frequency to frequency components of the modulated waveform signal, time domain filtering, a convolutional operation, and amplitude modification, to thereby modify the modulated waveform signal so that the modulated waveform signal varies over time so that the modified modulated waveform signal will be passed by a voice activity detector;
   a speech compression module arranged to convert the modulated waveform signal after the compressed signal has been transmitted over the speech channel to compensate for a response of the speech channel; and
   a demodulator arranged to retrieve the input digital data from the filtered modulated waveform signal.

2. A system according to claim 1 wherein the modulator further comprises a channel encoder arranged to channel encode the digital input data prior to modulation.

3. A system according to claim 2 wherein the demodulator comprises a channel decoder arranged to channel decode the digital input data.

4. A system according to claim 2 wherein the modulator is arranged to modify the modulated waveform signal by adding periodicity to the modulated waveform signal.

5. A system according to claim 1, wherein the spectral shaping module includes applying the periodic gain that varies with the frequency to frequency components of the modulated waveform signal.

6. A system according to claim 1 wherein the demodulator is arranged to inverse modify the modulated waveform signal.

7. A system according to claim 1 wherein each of the symbols has at least one feature that has a position, an amplitude, and a sign, wherein at least one of the position, the amplitude and the sign of the feature is determined by the digital input data.

8. A system according to claim 7 arranged such that the position of the feature is determined by the digital input data.

9. A system according to claim 7 wherein each of the symbols is arranged to have a plurality of features each having a position, an amplitude and a sign, and at least one of the position, the amplitude and the sign of each of the features is arranged to be determined by the digital input data.

10. A system according to claim 9 wherein the sign of the plurality of the features is arranged to alternate from one feature to the next to produce an alternating signal.

11. A system according to claim 9 wherein each of the symbols is arranged to have a plurality of sample positions, and the sample positions are divided into groups with one feature allocated to each group, such that there is one feature within each group of positions.

12. A system according to claim 11 wherein the position of each feature is arranged to define a group of bits in the digital input data.

13. A system according to claim 12 wherein each group of sample positions is allocated to a respective group of bits within the digital input data.

14. A system according to claim 7 wherein each symbol is arranged to carry a plurality of bits of data and the demodulator is arranged to determine a weight value for each of the bits of data derived from a similarity of the symbol to each reference signal of a range of reference symbols.

15. A system according to claim 14 wherein the channel decoder is arranged to estimate the bits of data from the weight values.

16. A system according to claim 1 wherein the demodulator is arranged to monitor a time lag in the filtered modulated waveform signal and correct for the time lag.

17. A system according to claim 16 wherein the demodulator is arranged to correct for the time lag before demodulating the filtered modulated waveform signal.

18. A system according to claim 16 wherein the filtered modulated waveform signal is arranged to be produced and detected at a first sample rate, and the demodulator is arranged to up sample the filtered modulated waveform signal to a higher sample rate before correcting for the time lag.

19. A system according to claim 1 further comprising a speech compression module arranged to produce the digital input data from a speech input, and a speech decompression module arranged to decode a speech output from the retrieved digital input data.

20. A system according to claim 19 further comprising an encryption module arranged to encrypt a compressed bit stream and a decryption module arranged to produce the compressed bit stream from the filtered modulated waveform signal.

21. A modem arranged to communicate over a voice channel of a network, the modem comprising:
  a modulator arranged to transform digital data to produce a modulated waveform signal resembling a speech signal, wherein the modulator is arranged, in transforming the digital data, to convert the digital data into a sequence of symbols each symbol comprising a segment of the modulated waveform signal, the modulator including a spectral shaping module that applies at least one of a periodic gain that varies with the frequency to frequency components of the modulated waveform signal, time domain filtering, a convolutional operation, and amplitude modification, to thereby modify the modulated waveform signal so that the modulated waveform signal varies over time so that the modified modulated waveform signal will be passed by a voice activity detector;
  a speech compression module arranged to convert the modulated waveform signal to a compressed signal for transmission onto the network;
  a channel compensation filter arranged to receive and filter the modulated waveform signal transmitted over the speech channel as the compressed signal to compensate for the response of the speech channel; and
  a demodulator arranged to retrieve the digital data from the filtered modulated waveform signal.

22. A method of transmitting digital input data over a speech channel of a network comprising the steps of:
  a. producing a modulated waveform signal transforming the digital input data for transmission over the network, wherein transforming the digital input data includes converting the digital input data into a sequence of symbols, each symbol comprising a segment of the modulated waveform signal, the modulator including a spectral shaping module that applies at least one of a periodic gain that varies with the frequency to frequency components of the modulated waveform signal, time domain filtering, a convolutional operation, and amplitude modification, to thereby modify the modulated waveform signal so that the modulated waveform signal varies over time so that the modified modulated waveform signal will be passed by a voice activity detector;
  b. converting the modulated waveform signal to a compressed signal utilizing a speech compression module for transmission over the network;
  c. filtering the modulated waveform signal after the modulated waveform signal has been transmitted over the speech channel as the compressed signal to compensate for a response of the speech channel; and
  d. retrieving the digital input data from the filtered modulated waveform signal.

23. A system according to claim 1 wherein the channel compensation filter is arranged to use a set of coefficients representing an average inverse of the response of the speech channel.

24. A system according to claim 1 further comprising a speech decompression module arranged to receive the compressed signal from the network and convert the compressed signal back to the modulated waveform signal.

* * * * *